United States Patent [19]
Uelzmann

[11] 3,715,341
[45] Feb. 6, 1973

[54] MODIFICATION OF CARBOXYL GROUP CONTAINING POLYMER WITH AZIRIDINYL SUBSTITUTED UNSATURATED LONG CHAIN ACYCLIC HYDROCARBONS

[75] Inventor: Heinz Uelzmann, Cuyahoga Falls, Ohio

[73] Assignee: The General Tire & Rubber Company, Akron, Ohio

[22] Filed: Jan. 19, 1971

[21] Appl. No.: 107,697

Related U.S. Application Data

[62] Division of Ser. No. 683,137, Nov. 15, 1967, Pat. No. 3,573,278.

[52] U.S. Cl............260/78.4 D, 260/2 N, 260/2 EN, 260/79, 260/79.3, 260/80.7, 260/80.78, 260/82.1, 260/83.5, 260/85.1, 260/94.7 N, 260/879
[51] Int. Cl. ........C08f 27/08, C08f 27/00, C08d 5/02
[58] Field of Search ..260/879, 94.7 N, 2 EN, 88 OR, 260/78.4 D, 2 N

[56] References Cited

UNITED STATES PATENTS

| | | | |
|---|---|---|---|
| 3,434,990 | 3/1969 | Adicoff et al. | 260/23.7 |
| 3,492,289 | 1/1970 | Symm et al. | 260/239 |
| 3,507,837 | 4/1970 | Hidinger | 260/78.4 |
| 3,544,541 | 12/1970 | Edwards et al. | 260/94.7 |
| 3,576,786 | 4/1971 | Kalfagan et al. | 260/47 |
| 3,600,272 | 8/1971 | Cortigene et al. | 162/164 |

*Primary Examiner*—James A. Seidleck
*Assistant Examiner*—William F. Hamrock
*Attorney*—Frank C. Rote, Jr. et al.

[57] ABSTRACT

Unsaturated, long chain, acyclic hydrocarbons having one or two aziridinyl substituents are prepared by reaction of an alkylenimino and a long chain alkatriene in the presence of an alkali metal or equivalent catalyst. The resulting aziridinyl products, e.g., the ethylenimine adduct of allocimene, contain at least three reactive groups, i.e., a combination of two aziridinyl groups and one olefinic unsaturation or one aziridinyl group and two olefinic unsaturations.

5 Claims, No Drawings

MODIFICATION OF CARBOXYL GROUP CONTAINING POLYMER WITH AZIRIDINYL SUBSTITUTED UNSATURATED LONG CHAIN ACYCLIC HYDROCARBONS

CROSS-REFERENCE TO RELATED APPLICATION

This application is a division of copending application Ser. No. 683,137, filed Nov. 15, 1967, now U.S. Pat. No. 3,573,278, dated Mar. 30, 1971.

BACKGROUND OF THE INVENTION

The term "aziridine" is sometimes used to designate the compound "ethylenimine" which is the name used in "Chemical Abstracts" and generally accepted by scientists throughout the world as designating the unsubstituted compound having the structure:

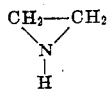

The terms "aziridine" an "aziridinyl" are more ordinarily used not for the purpose of designating the unsubstituted heterocyclic compound, but as a basis for systematic names of its derivatives (see U.S. Pat. No. 3,231,563). The term "aziridinyl" is used herein to denote a group obtained by removal of the imino hydrogen atom from ethylenimine or ethylenimine which is substituted with one or more hydrocarbon radicals attached to the carbon atoms of the heterocyclic ring.

Aziridinyl compounds are relatively highly reactive substances and as such have been utilized for a variety of purposes which take advantage of the reactivity of the aziridinyl group with other chemical substances. Some uses which have attained commercial significance include chain extending of polymers (U.S. Pat. No. 2,901,443) and cross-linking or curing of prepolymers containing carboxyl or other reactive groups (U.S. Pat. No. 3,182,040). It is also known to employ aziridinyl compounds as curing agents for epoxy resins (U.S. Pats. Nos. 2,712,535 and 3,079,367).

The utility of aziridinyl compounds as polymer modifying or curing agents could be increased if aziridinyl compounds were available having at least three reactive groups, one of which was olefinic unsaturation which would permit modifying polymer products formed from such compounds through reaction of the unsaturated group. Compounds of this type having at least three reactive groups would permit difunctional cross-linking to be accomplished while still retaining olefinic unsaturation enabling the grafting of polymers or other reactions known to the art to be employable with polymers containing olefinic unsaturation.

It is known to prepare aziridinyl compounds containing olefin unsaturation by reaction of ethylenimine or related alkyl substituted ethylenimines with diolefins (U.S. Pat. No. 2,654,737). The resulting compounds contain at most only two reactive groups, namely, an aziridinyl group and an olefinic group.

OBJECTS

A principal object of this invention is the provision of new aziridinyl substituted, unsaturated, long chain, acyclic hydrocarbons.

A further object of this invention is the provision of new compounds containing at least three reactive groups from any combination of at least one aziridinyl group and at least one olefinic unsaturation.

A further object is the provision of reactive compounds capable of use in chain extending or cross-linking of polymers and possessing at least three reactive groups, two of which may be used for reaction with preformed polymer material while allowing olefinic unsaturation to be retained in the resulting product, which unsaturation is in a structural arrangement permitting additional polymers or other groups to be grafted thereto or to be crosslinked.

Other objects and further scope of applicability of the present invention will become apparent from the detailed description given hereinafter; it should be understood, however, that the detailed description end specific examples, while indicating preferred embodiments of the invention, are given by way of illustration only, since various changes and modifications within the spirit and scope of the invention will become apparent to those skilled in the art from this detailed description.

SUMMARY OF THE INVENTION

The foregoing objects are accomplished in accordance with the invention by the provision of unsaturated acyclic aziridinyl hydrocarbons of the formula:

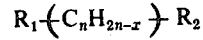

wherein $R_1$ is the group:

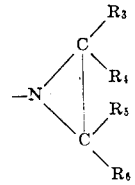

$R_2$ is hydrogen or $R_1$,
$n$ is an integer from 10 to 20,
$x$ is the integer 3 when $R_2$ is hydrogen and the integer 2 when $R_2$ is $R_1$, and
$R_3$, $R_4$, $R_5$ and $R_6$ are hydrogen or 1 to 4 carbon atom alkyl.

The new compounds of the invention are prepared by the addition of ethylenimine or substituted aziridines containing up to 4 alkyl groups having from 1 to 4 carbon atoms across the double bonds of a triconjugated alkatriene containing 10 to 20 carbon atoms in the presence of a catalytic amount of an alkali metal or related alkali metal derivative having catalytic activity for the addition reaction, e.g., an alkali metal hydride, metal alkyl or an alkali metal salt of the aziridine compound used in the addition reaction, such as sodium ethylenimide.

In addition to ethyleminine, preferred aziridine compounds for use in the invention are propylenimine and butylenimine. The preferred triconjugated hydrocarbon for use in the invention is allo-ocimene.

The addition reaction between the unsaturated hydrocarbon and the aziridine compound may be conducted, such as by the use of approximately equimolar proportions, to produce a mono-adduct, i.e., an unsaturated hydrocarbon containing one aziridinyl group. The reaction may also be conducted, such as by the use of 2 moles or greater of the aziridine compound for each mole of the triconjugated hydrocarbon, thereby forming the bi-adduct of the unsaturated long-chain hydrocarbon.

The objects of the invention are further accomplished by the utilization of the resulting aziridinyl unsaturated long-chain hydrocarbons for the modification of polymers, including chain-extending and cross-linking reactions. The new compounds find particular utility for reaction with prepolymers or polymers which contain acid groups such as carboxyl groups, mercaptan groups, —$SO_3H$, $SO_2H$, or amines in the presence of Lewis acids to modify or cure them. It has been found that the aziridine group of the new compounds reacts preferentially with such active hydrogen compounds, leaving the double bonds of the compound free for further reaction such as cross-linking with sulfur, peroxides or other agents known to be useful for reaction with olefinic unsaturations of polymers like high molecular weight polymers. These compounds can also be used to cure epoxy resins.

EXAMPLES

The following details of operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

Example 1: Ethylenimine Mono-Adduct of Allo-Ocimene

A glass reaction vessel equipped with stirrer, a reflux condenser, dropping funnel, and thermometer was charged under a nitrogen atmosphere with 860 parts of pure ethylenimine and 15 parts of sodium. The contents were refluxed for 30 minutes and 680 parts freshly distilled allo-ocimene added dropwise at reflux temperature. Because of the exothermic reaction, external heating was interrupted intermittently. After addition was completed, the reaction mixture was refluxed for 2.5 hours by application of external heat.

Excess ethylenimine was distilled off under atmospheric pressure up to a pot temperature of 100°C., about 620 parts being recovered. The remaining material was distilled in vacuum.

Fraction A boiled at 35°/57°C. (0.15mm) and amounted to 236 parts.

Fraction B boiled at 57°/60°C. (0.15mm) and amounted to 437 parts.

Fraction B was pure ethylenimine mono-adduct of alloocimene, while Fraction A appeared to be a mixture of the monoadduct with some starting material and other by-products as can be concluded from the analysis below:

ANALYSIS:

| % Aziridine | Found | Calc. for mono-adduct |
|---|---|---|
| Fraction A | 38.95 | 23.3 |
| Fraction B | 23.02 | 23.3 |
| % Nitrogen | | |
| Fraction A | 3.25 | 7.77 |
| Fraction B | 7.90 | 7.77 |

Example 2: Propylenimine Mono-Adduct of Allo-Ocimene

In a glass reaction vessel equipped as described in Example 1, a mixture of 114 parts of pure propylenimine and 2 parts of sodium were refluxed for one hour under a nitrogen atmosphere. Freshly distilled allo-ocimene, 68 parts, were added dropwise at reflux temperature. At the end of the addition, the pot temperature had risen to 95°C. The mixture was refluxed for two more hours and subjected to vacuum distillation after cooling.

The main fraction boiled at 46°151°C. (0.05 mm) and amounted to 82 parts.

Analysis:
  % Aziridine: Calc. 21.76; Found 18.81
  % Nitrogen: Calc. 7.20; Found 6.18

Example 3: Butylenimine Mono-Adduct of Allo-Ocimene

Pure butylenimine, 142 parts, and 2 parts of sodium were refluxed for one hour as described in Example 1. Then, 68 parts of allo-ocimene were added dropwise at reflux temperature while the pot temperature rose to 105°C. After refluxing for an additional three hours, the reaction mixture was cooled and distilled in vacuum.

The fraction boiling at 104°/110°0.3 mm.
pressure amounted to 13 parts and gave the following analysis:

Analysis:
  % Aziridine: Calc. 20.30; Found 20.25
  % Nitrogen: Calc. 6.70; Found 7.55.

The residue in the flask was polymeric and amounted to 69 parts.

Example 4: Ethylenimine Di-Adduct of Allo-Ocimene

A glass reaction vessel equipped with stirrer, reflux condenser, dropping funnel and thermometer was charged with 1220 parts pure ethylenimine and 12 parts freshly cut sodium under a nitrogen blanket. The contents were refluxed for 35 minutes and 1020 parts freshly distilled allo-ocimene then added through the dropping funnel. The reaction was exothermic and the heating was discontinued while the addition of the allo-ocimene was regulated in such a way that the reaction mixture continued to reflux. The addition took about 1.5 hours and towards the end of the addition, external heat was applied again. After the addition was completed, the contents were heated at reflux temperature for an additional 2 hours.

Excess ethylenimine was distilled off, 815 parts being recovered. By applying vacuum, an additional amount of 140 parts crude ethylenimine were obtained up to a pot temperature of 60°C. The remaining product was then fractionated in vacuum.

A forerun boiling at 63°–77°C., 0.6 mm was obtained which amounted to 270 parts and was discarded.

The ethylenimine mono-adduct of allo-ocimene was collected at a boiling range of 67°–85°C., 0.5 mm and amounted to 650 parts.

The third fraction boiling at 91°–104°C., 0.5 mm, was the di-adduct and amounted to 186 parts. This fraction was redistilled and gave 104 parts of a boiling range 82°–92°C., 0.1 mm, consisting of isomers of the di-adduct.

The diadduct had the general formula:

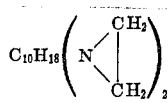

Analysis:
% Aziridine

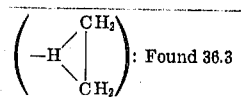 : Found 36.3

Calculated for the di-adduct: 37.9

Example 5: Reaction of Adduct with Polymer

A mixture was formed from 1500 parts of dicarboxyl polybutadiene (carboxyl content 0.415 milliequivalent per gram) and 60 parts of the di-adduct of Example 4. This mixture was poured into small polyethylene molds and allowed to stand in an oven at 80°C. for 4 days. There was obtained molded rubbery polymer. The polymer was milled with sulfur and then vulcanized to a hard rubber product.

DISCUSSION OF DETAILS

An essential reagent in the methods of the invention is an aziridine possessing a hydrogen atom in the one-position, i.e., on the nitrogen atom of the heterocyclic ring. Examples of such aziridines, in addition to the preferred compounds hereinbefore mentioned, include:

2,3-dimethyl ethylenimine; 2-Methyl-3-butyl ethylenimine; 2,2-dimethyl-3,3-diethyl ethylenimine; 2,3-dipropyl ethylenimine; 2-methyl-3-ethyl-3-butyl ethylenimine; 2-ethyl ethylenimine; and 2-butyl ethylenimine and the like and mixtures thereof.

Aziridine compounds having at least two hydrogen atoms on the carbon atoms of the heterocyclic ring are advantageously used for the methods of the invention.

Another essential reagent for the production of the new compounds of the invention is an alkatriene of the general formula:

$$C_nH_{2n-4}$$

wherein:

$n$ is an integer between 10 and 20. Advantageously, the three olefinic unsaturations of the alkatriene are conjugated. The preferred alkatriene is allo-ocimene having the formula:

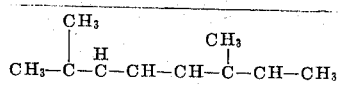

As a triconjugated system, this compound may add to the aziridine reagent by either 1,2- or 1,4-type addition leaving one or two double bonds unreacted depending upon whether conditions are used to form a mono-adduct or a di-adduct.

Other alkatrienes for use in the invention include:
2,4,6-decatriene;
2,6,10-trimethyl-2,4,6-dodecatriene;
2,6,10,14-quadmethyl-6,8,10-hexadecatriene;
2,4,6-dodecatriene;
2,6,10-octadectriene;
2,6-dihexyl-2,4,6-octatriene; and the like and mixtures thereof.

Additional usable alkatrienes are known, e.g., see U.S. Pat. No. 3,227,628.

Generally, to get the best yields of the adduct molar excesses of the aziridine compound should be used as compared to the alkatriene. Reaction temperatures of between 50°–150°C. and reaction times between 1–10 hours can be used.

In reacting the aziridine reagent with the alkatriene, alkali metals may be used to catalyze the reaction. The active species is the metal salt, such as sodium ethylenimide. Such metal salts can also be formed from the corresponding metal hydride, metal alkyl and the like.

In the formation of elastomeric compositions or other reaction mixtures, between the new aziridinyl adducts and carboxyl containing polymers in accordance with the invention, various reaction conditions may be employed. These will depend, to some extent, upon the particular polymers which are cured with the aziridinyl adducts and additional compounding or modifying agents which might be incorporated in the compositions. Advantageously, the curing reaction is conducted at a temperature between 25° and 175°C. for between 0.25 and 96 hours, generally shorter times being employed the higher the temperature. A preferred range of curing times and temperatures is 15–60 minutes at 135°–165°C. for molded rubber products. Usually the curing operation will take place while the aziridinyl adduct and polymer mixture is being suitably shaped, e.g., cast in molds, extruded through dies, calendered or cast into films or the like.

In producing the compositions of this invention, it is preferred that the amount of the aziridine hydrocarbon compound employed be such that there is at least one aziridinyl group present for each carboxyl group present in the polycarboxy organic compound employed and even more preferably that an excess of the aziridinyl compound over that necessary to react with the polycarboxylic organic compound be employed. By way of illustration as to what is meant in the previous statement, for each carboxyl group (COOH) in the polycarboxy compound, it is preferred to employ sufficient aziridinyl compound so that there is slightly more than one aziridinyl group per COOH group. Generally, at least 0.1 to 10 percent by weight of the aziridinyl adduct is used based on the weight of the polymer.

The carboxy containing polymers which are especially useful in producing the products of this invention comprise carboxy containing polymers produced from a number of starting materials. These starting materials include conjugated dienes containing from 4 to 8 carbon atoms, such as, for example, piperylene, isoprene, 1,3-hexadiene, butadiene, methylpentadiene, 1,3-octadiene, and the like.

The carboxy containing polymers also include copolymers of the above dienes with other olefin monomers, such as, for example, styrene and alkyl styrenes, vinyl naphthalene, vinyl toluene, and the like; olefinically unsaturated heterocyclic nitrogen compounds such as, 2-vinylpyridine, 3-vinylpyridine, 4-vinylpyridine, 3,5-diethyl-4-vinylpyridine, 3-ethyl-5-vinylpyridine, 2-methyl-5-vinylpyridine, and the like and disubstituted alkenyl pyridines, quinolines, and the like; the acrylic acids and their esters, such as methacrylic and acrylic acid, maleic acid, methyl methacrylate, ethyl methacrylate, propyl methacrylate, butyl methacrylate and the like; methyl vinyl ether, vinyl chloride, vinylfuran, vinylcarbazole and the like, e.g., butadiene-styrene-acrylic or methacrylic acid terpolymers, butadiene-acrylonitrile-acrylic acid terpolymers, BDN-acrylic acid copolymers, methyl methacrylate methacrylic acid copolymers, and methyl methacrylate -methyl acrylate-acrylic acid terpolymers. Examples of mercaptan group containing polymers are the polyalkylene sulfides and other polythioethers, e.g., "Thiokols".

Useable products can be formed by mixtures which consist solely of the aziridine and the carboxyl containing polymer. Mixtures of two or more of either or both of these basic reactants may be employed. Also, additional compounding agents commonly employed in rubber and polymer fabrication may be incorporated. Such added materials which may typically constitute 1–75 percent and preferably 5–50 percent of the total composition including the aziridine and the carboxyl containing polymer. Examples of such additional materials include fillers or pigments, e.g., carbon black, chalk, zinc oxide, barium sulfate, titanium dioxide, chromium oxide and the like; fire retardants, e.g., polychloroaromatic compounds, zinc borate, antimony sulfides and the like; light stabilizers; antioxidants; plasticizers, e.g., dialkyl phthalates, fatty acid esters, etc.; heat stabilizers, mold release lubricants, other curing agents, accelerators, and the like.

The reaction products of the new aziridinyl adducts and active hydrogen containing polymers are useful in making resinous and rubbery products including paper coatings, protective coatings for fabrics and metals, rug backings, packaging films, automobile body bushings, gaskets, propellant binders and the like.

The embodiments of the invention in which an exclusive property or right is claimed are defined as follows:

1. Cross-linked or chain-extended polymer compositions made by the process which comprises:

a. forming a mixture of a major portion of a carboxyl group containing polymer and a minor portion of an unsaturated acyclic aziridinyl hydrocarbon of the formula:

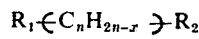

wherein:
   $R_1$ is the group:

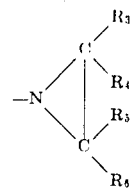

$R_2$ is hydrogen or $R_1$,
   $R_3$, $R_4$, $R_5$ and $R_6$ are hydrogen or 1 to 4 carbon atom alkyl radicals,
   $n$ is an integer from 10 to 20, and
   $x$ is the integer 3 when $R_2$ is hydrogen and the integer 2 when $R_2$ is $R_1$, and b. heating the resulting mixture to an elevated temperature sufficient to produce reaction between said polymer and said aziridinyl hydrocarbon.

2. A composition of claim 1 wherein said carboxyl group containing polymer is carboxyl-terminated conjugated diolefin polymer.

3. A composition of claim 2 wherein said carboxyl-terminated diolefin polymer is dicarboxyl polybutadiene.

4. A composition of claim 1 wherein said aziridinyl hydrocarbon is the ethylenimine diadduct of allo-ocimene.

5. A composition of claim 1 wherein said mixture consists essentially of 0.1 to 10 percent aziridinyl dihydroallo-ocimene and the remainder is dicarboxyl polybutadiene.

* * * * *

PO-1050
(5/69)

UNITED STATES PATENT OFFICE
CERTIFICATE OF CORRECTION

Patent No. 3,715,341      Dated February 6, 1973

Inventor(s) Heinz Uelzmann

It is certified that error appears in the above-identified patent and that said Letters Patent are hereby corrected as shown below:

ABSTRACT, line 3, which reads: "alkylenimino" should read ---alkylenimine---.

ABSTRACT, line 6, which reads: "allocimene" should read ---alloocimene---.

Column 2, line 22, which reads: "end" should read ---and---.

Column 4, line 16, which reads: "46°151°C." should read ---46/51°C.---.

Column 4, line 30, which reads: "104°/110°0.3 mm" should read --- 104/110°C. under 0.3 mm---.

Column 5, line 55, which reads: "$CH_3-\overset{H}{\underset{CH_3}{C}}-\overset{CH_3}{C}-CH-CH-\overset{CH_3}{C}-CH-CH_3$"
should read --- $CH_3-\overset{H}{\underset{CH_3}{C}}=C-CH=CH-\overset{CH_3}{C}=CH-CH_3$ ---.

Column 5, line 70, which reads: "2,6,10-octadectriene" should read ---2,6,10-octadecatriene---.

Signed and sealed this 10th day of July 1973.

(SEAL)
Attest:

EDWARD M. FLETCHER, JR.      Rene Tegtmeyer
Attesting Officer      Acting Commissioner of Patents